(12) United States Patent
Shibata et al.

(10) Patent No.: US 8,575,922 B2
(45) Date of Patent: Nov. 5, 2013

(54) MULTI-TURN ANGLE SENSOR

(75) Inventors: Shinji Shibata, Aichi (JP); Yasukazu Hayashi, Aichi (JP)

(73) Assignee: OKUMA Corporation, Aichi (JP)

( * ) Notice: Subject to any disclaimer, the term of this patent is extended or adjusted under 35 U.S.C. 154(b) by 368 days.

(21) Appl. No.: 12/955,566

(22) Filed: Nov. 29, 2010

(65) Prior Publication Data

US 2011/0156699 A1    Jun. 30, 2011

(30) Foreign Application Priority Data

Dec. 24, 2009    (JP) ................. 2009-292202

(51) Int. Cl.
*G01B 7/30*    (2006.01)

(52) U.S. Cl.
USPC ....... 324/207.25; 310/83; 310/68 B; 702/151; 702/94; 33/1 PT; 73/862.46

(58) Field of Classification Search
USPC ............ 324/207.18, 207.25, 173–174; 310/68 B; 33/1 PT; 702/151, 94; 701/41–43
See application file for complete search history.

(56) References Cited

U.S. PATENT DOCUMENTS

2005/0279180 A1* 12/2005 Aokii et al. ............... 73/862.325
2009/0058405 A1*  3/2009 Oike et al. ................. 324/207.25

FOREIGN PATENT DOCUMENTS

| JP | S48-24071 B1 | 7/1973 |
|---|---|---|
| JP | 2002107177 A | 4/2002 |
| JP | 3414953 | 4/2003 |
| JP | 2007278728 A | 10/2007 |

OTHER PUBLICATIONS esp@cenet patent abstract for Japanese Publication No. 10146033, Publication date May 29, 1998 (1 page).
Office Action issued in corresponding Japanese Application No. 2009-292202 dated Jul. 30, 2013 with English translation (5 pages).

* cited by examiner

*Primary Examiner* — Arleen M Vazquez
*Assistant Examiner* — Son Le
(74) *Attorney, Agent, or Firm* — Osha Liang LLP

(57) ABSTRACT

A multi-turn angle sensor includes rotors 60, 62, 64, each of which rotates in a different manner with respect to an input shaft 19, and a common stator portion 66. The rotors and pole teeth disposed around the rotors form each of resolvers 600, 620, 640. At least two of the resolvers are arranged on a single plane vertical to the rotation central axis of each of the rotors. The common stator portion 66 surrounding each of the rotors is formed by laminating electromagnetic steel sheets 106, each of which has an identical shape including a plurality of sets of pole teeth corresponding to each of the rotors. A single length of unspliced electrical wire is wound around each of the pole tooth sets. This facilitates automation of assembly.

2 Claims, 6 Drawing Sheets

| STATOR (FIG. 5) | WINDING (FIG. 6) | EXCITATION WIRING (FIG. 7) | SENSING WIRING (FIG. 7) |
|---|---|---|---|
| 6 1 A | 1 2 1 | e 1 | a 1 |
| | 1 2 2 | e 2 | b 1 |
| | 1 2 3 | e 3 | a 2 |
| | 1 2 4 | e 4 | b 2 |
| 6 3 A | 1 1 1 | f 1 | a 3 |
| | 1 1 2 | f 2 | b 3 |
| | 1 1 3 | f 3 | a 4 |
| | 1 1 4 | f 4 | b 4 |
| 6 5 A | 1 3 1 | g 1 | a 5 |
| | 1 3 2 | g 2 | b 5 |
| | 1 3 3 | g 3 | a 6 |
| | 1 3 4 | g 4 | b 6 |

FIG. 8 (Prior Art)

| STATOR (FIG. 1) | WINDING (FIG. 1) | EXCITATION WIRING (FIG. 4) | SENSING WIRING (FIG. 4) |
|---|---|---|---|
| 6 6 | 1 2 1 | e 1 | a 1 |
| | 1 2 2 | e 2 | b 1 |
| | 1 2 3 | e 3 | a 2 |
| | 1 2 4 | e 4 | b 2 |
| | 1 1 1 | f 1 | a 3 |
| | 1 1 2 | f 2 | b 3 |
| | 1 1 3 | f 3 | a 4 |
| | 1 1 4 | f 4 | b 4 |
| | 1 3 1 | g 1 | a 5 |
| | 1 3 2 | g 2 | b 5 |
| | 1 3 3 | g 3 | a 6 |
| | 1 3 4 | g 4 | b 6 |

FIG. 9

MULTI-TURN ANGLE SENSOR

CROSS REFERENCE TO RELATED APPLICATIONS

This application claims priority to Japanese Patent Application No. 2009-292202, filed on Dec. 24, 2009, which is incorporated herein by reference in its entirety.

BACKGROUND

1. Technical Field

The present invention relates to a multi-turn angle sensor which includes two or more resolvers having a structure which facilitates assembly.

2. Related Art

Japanese Patent Publication JP 3414953 A discloses a conventional multi-turn angle sensor which has a rotation shaft and a resolver which can sense a rotation angle of a shaft in one turn. This multi-turn angle sensor can sense a rotation angle of shaft for multiple turns, such as several hundred turns, by positioning the resolver on a speed reduction shaft whose speed is reduced from the speed of the rotation shaft.

FIG. 5 of the present application relates to FIG. 1 of JP 3414953 A, which is a cross-sectional view in an axial direction showing one embodiment of an absolute encoder in which three reluctance-type resolvers are coaxially placed. FIG. 6 is a cross-sectional view taken along the line I-I of FIG. 5.

The three resolvers, each of which is respectively formed by stators 61A, 63A, 65A and rotors 60, 62, 64, are arranged coaxially. An input shaft 19 is supported by casings 81, 84 via bearings 90, 95. A rotor 60 and non-magnetic gear 25 are connected to the input shaft 19 by interference fit. A shaft 20 is supported by the casings 81, 84 via bearings (not shown). Non-magnetic gears 26, 27, 29 are connected to the shaft 20 by interference fitting. A rotor 62 and non-magnetic gear 28 are connected to the input shaft 19 by interference fit via a bearing 93. A rotor 64 and non-magnetic gear 30 are connected to the input shaft 19 interference fitting via a bearing 94.

A speed reduction gear mechanism is formed by engagements between gear 25 with gear 26, gear 27 with gear 28, and gear 29 with gear 30. Gear 28 paired with rotor 62 and gear 30 paired with rotor 64 respectively. The speed reduction gear mechanism causes the rotor 62 to be rotated for every 24 rotations of the input shaft 19, and the rotor 64 to be rotated once for every 25 rotations of the input shaft 19.

As shown in FIG. 6, both of stator 63A and rotor 62 are formed by laminating thin plates of magnetic material produced by die blanking. The rotor 62 has a cylindrical shape arranged to eccentrically rotate about the center of a rotation shaft 80. The stator 63A is provided with four pole teeth 101 to 104, around each of which is wound one of four windings 111 to 114. Similarly, stator 61A (refer to FIG. 8) is provided with wirings 121 to 124 (not shown in FIG. 6), and stator 65A (refer to FIG. 8) with wirings 131 to 134 (not shown in FIG. 6). Each of these windings comprises excitation wiring and sensing wiring.

FIG. 7 shows a layout of wirings 111 to 114, 121 to 124, and 131 to 134. Circles 1-10 in FIG. 7 represent each of the connections to a connector 68 provided on printed circuit boards 51, 52, arranged between 61A and 63A and between 63A and 65A, respectively. The number with which each circle is labeled represents a pin number of a pin of the connector 68. FIG. 8 shows the relationships between the wiring shown in FIG. 6, and the excitation wiring numbers and sensing wiring numbers in FIG. 7. For example, FIG. 7 shows that the wiring 111 of the stator 63A is formed by an excitation wiring f1 and a sensing wiring a3. The connections between the wirings and between the wirings and the connector 68 are achieved by soldering connections onto the printed circuit boards 51, 52.

In the resolver formed by the stator 63A and rotor 62, a voltage in accordance with a rotation angle of the rotor is generated between pins 5 and 4 and between pins 6 and 4 of the connector 68 by applying a pulse voltage between pins 2 and 4 of the connector 68. An absolute position of the input shaft 19 for up to 25 turns can be sensed by interpolating a generated voltage. Further, the other two resolvers have structures similar to the resolver formed by the stator 63A and rotor 62, that is, the structure respectively formed by stator 61A and rotor 60, and stator 65A and rotor 64. These two resolvers can respectively sense an absolute position of the input shaft at one turn and 24 turns. A position of the input shaft 19 up to 600 turns can be accurately detected by numerically processing the values of the three absolute positions sensed by these three resolvers.

SUMMARY

In the above conventional multi-turn angle sensor, because separated stator portions are used for the multiple resolvers, highly accurate assembly of the stator portions is required. Further, because the multiple resolvers are placed in tandem in the axial direction, employing a winding machine to directly wind windings after installation of the multiple resolvers is problematic and difficult. Furthermore, it is necessary to connect the windings common to the multiple resolvers by soldering on printed circuit boards after the windings are wound around the pole teeth.

The present invention provides a multi-turn angle sensor comprising a plurality of resolvers. This multi-turn angle sensor further comprises a plurality of rotors, each of which rotates in a different manner with respect to an input shaft by using a speed reduction mechanism, and a common stator portion which surrounds each of the rotors and includes an equal number of rotors and sets of pole teeth. The rotors and sets of pole teeth are disposed around the rotors and form the resolvers. At least two of the pluralities of resolvers are arrange in a single plane vertical to a rotation central axis of each rotor. The common stator portion surrounding each of the rotors is formed by laminating electromagnetic steel sheets, each of which has an identical shape including a plurality of sets of pole teeth for each of the rotors.

It is preferable in a multi-turn angle sensor according to the present invention that a resin bobbin around which a winding is wound is integrally formed on the pole teeth of the stator portion of the plurality of resolvers.

It is also preferable in a multi-turn angle sensor according to the present invention that at least one of the windings wound around each of the pole teeth of the plurality of resolvers is formed from a single length of electrical wire with no joint for a plurality of pole teeth of the plurality of resolvers.

ADVANTAGE OF THE INVENTION

In a multi-turn angle sensor of the present invention, multiple resolvers can be arranged in a single plane by laminating a plurality of electromagnetic sheets formed through die blanking in such a manner that all of the pole teeth of the stator portion are formed from a single plate. Because, as a result, no high-tolerance stator assembly operation is necessary, accuracy in stator positioning is enhanced.

Further, by integrally forming bobbins with the pole teeth of the multiple resolvers, stator windings can be wound directly using a winding machine and common techniques. Furthermore, by winding a single length of electrical wire with no joint around multiple pole teeth of multiple resolvers, a conventional winding operation of windings to pole teeth of a stator portion as well as printed circuit board for wiring can be omitted. Thereby, the present invention can provide a multi-turn angle sensor which can be easily assembled through an automated winding process applied to multiple windings, thereby in turn reducing manufacturing cost and increasing accuracy.

BRIEF DESCRIPTION OF THE DRAWINGS

The above and other objects of the invention will be explained in the description below, in connection with the accompanying drawings, in which:

FIG. 8 is a table showing relationships between the windings shown in FIG. 6 and the winding layout shown in FIG. 7 for a conventional reluctance-type resolver; and FIG. 9 is a table showing relationships between the windings shown in FIG. 1 and the winding layout shown in FIG. 4 for a reluctance-type resolver in accordance with one embodiment of the present invention.

DETAILED DESCRIPTION

A reluctance-type resolver of an embodiment of a multi-turn angle sensor according to the present invention is described below with reference to the accompanying drawings.

Figure 1:
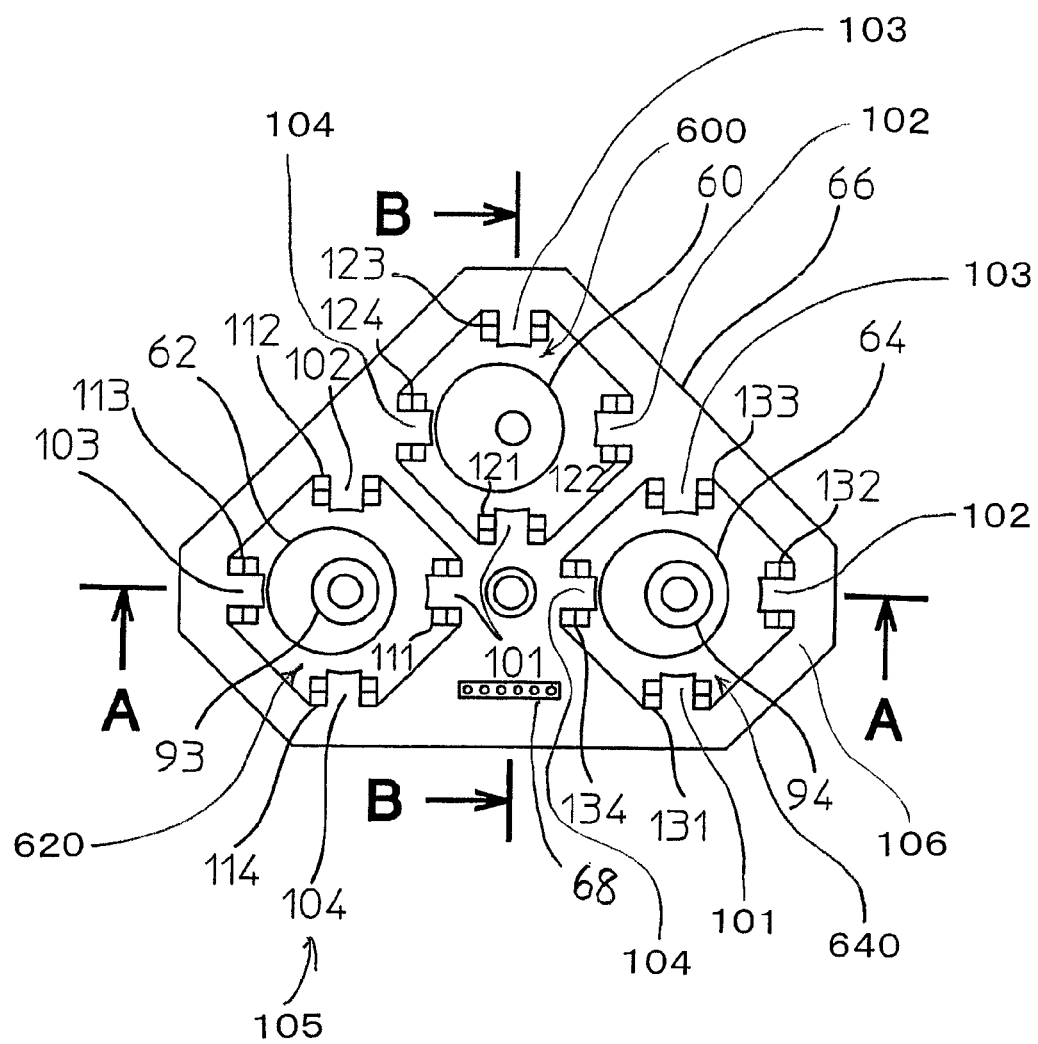
FIG. 1 shows a cross-sectional view of a reluctance-type resolver in accordance with one embodiment of the present invention.
Figure 2:
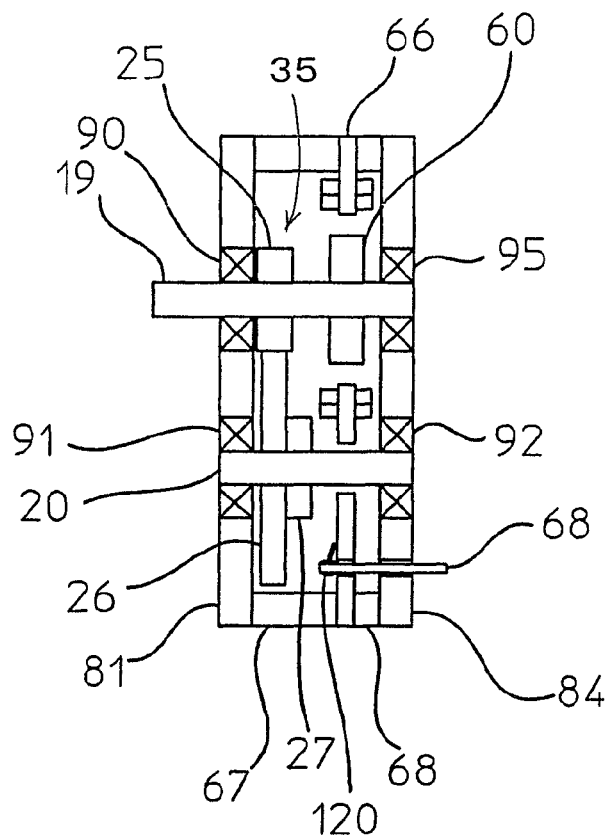
FIG. 2 shows a cross-sectional view taken along the line B-B of FIG. 1.
Figure 3:
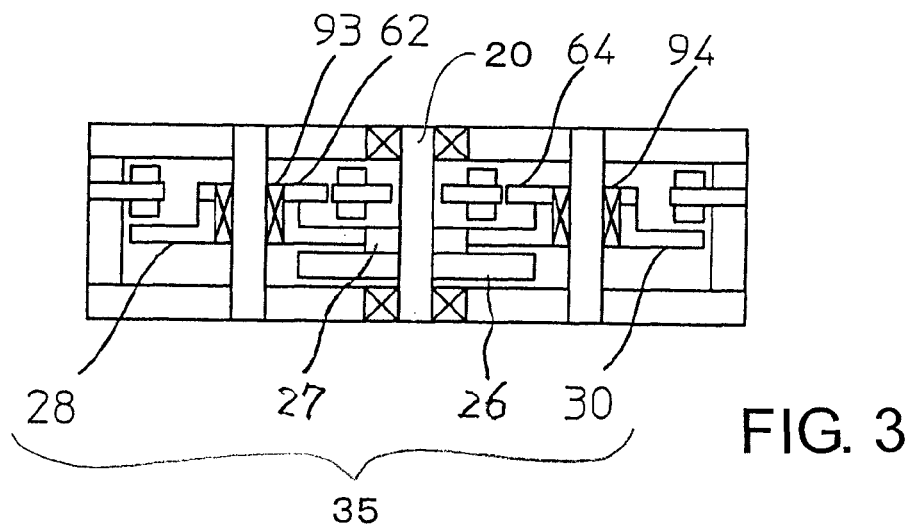
FIG. 3 shows a cross-sectional view taken along the line A-A of FIG. 1.
Figure 5:
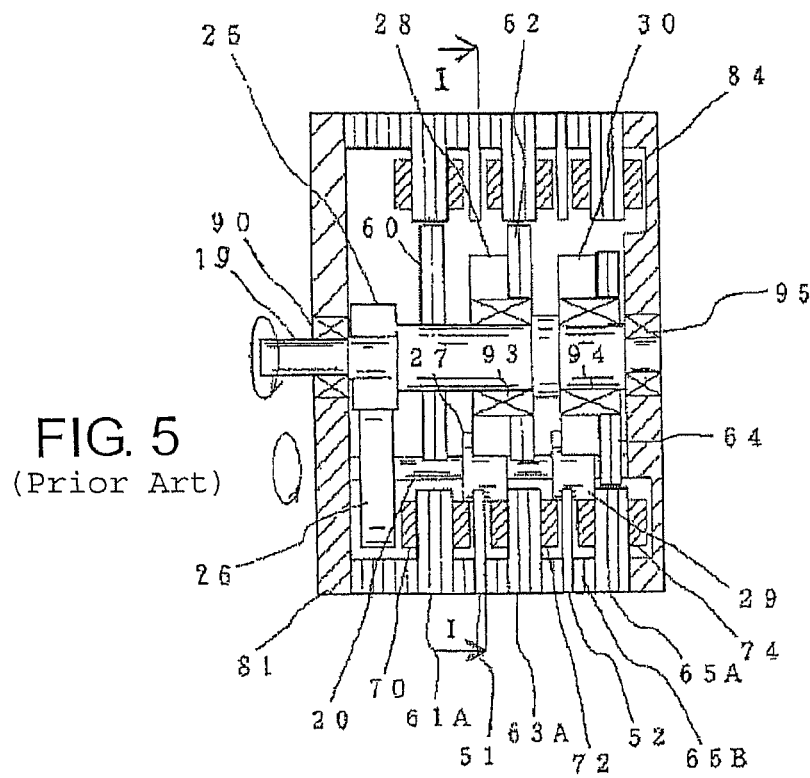
FIG. 5 is a cross-sectional view of a conventional reluctance-type resolver in the axial direction.
Figure 6:
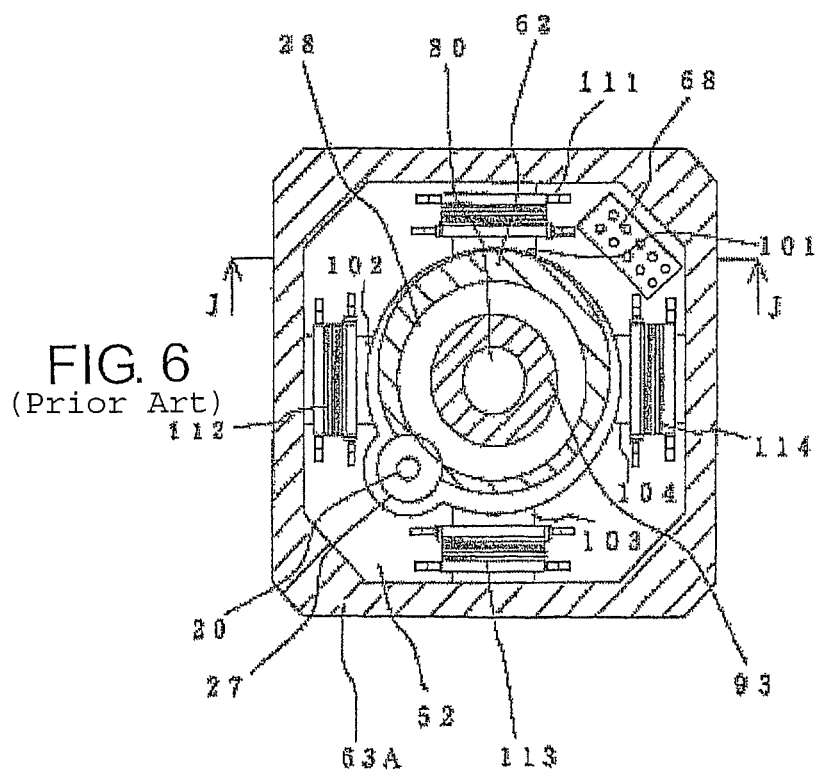
FIG. 6 is a cross-sectional view taken along the line I-I of FIG. 5.

FIG. 1 is a cross-sectional view of a reluctance-type resolver in accordance with an embodiment of the present invention in a vertical direction with respect to the axial direction. FIG. 2 is a cross-sectional view taken along the line B-B of FIG. 1. FIG. 3 is a cross-sectional view taken along the line A-A of FIG. 1. Elements corresponding to those described above in regards to the conventional are shown in FIGS. 5 and 6 are assigned the same reference numbers as used above, and are not described in detail below.

A reluctance-type resolver in accordance with one embodiment of the present invention includes three resolvers 600, 620, 640. The three resolvers 600, 620, 640 each respectively comprise one of three rotors 60, 62, 64, and one of three sets of pole teeth 101 to 104 provided on the common stator portion 66. The number of sets of pole teeth 101 to 104 therefore corresponds to the number of rotors. A bobbin made of resin is integrally formed with each of the pole teeth 101 to 104. Around each of the bobbins, is wound one of the windings 111 to 114, 121 to 124, or 131 to 134. The rotors 60, 62, 64 of each resolver 600, 620, 640 are arranged such that their respective centers of rotation are located near one of the vertices of a triangle such as an equilateral triangle and isosceles triangle. Around the circumference of each rotor 60, 62, and 64 are provided four pole teeth 101 to 104, each having a bobbin around which a winding is wound. Resolvers 600, 620, 640 are arranged in a single plane which is vertical to the rotation central axis of each rotor 60, 62, 64. Pole teeth 101 to 104 form a pole tooth set 105.

The stator portion 66 common to the three resolvers 600, 620, 640 is formed from a magnetic material such as an electromagnetic steel sheet and may be manufactured through automated press processing using progressive metal dies. The stator portion 66 is formed by laminating electromagnetic steel sheets 106 which are formed through press processing using a blanking die to have an identical shape in which three sets of a shape having four pole teeth 101 to 104 are provided on a single plane. In this way, three sets of pole teeth 101 to 104 of three resolvers 600, 620, 640 are formed in the single stator portion 66. Bobbins made of insulating resin around which the windings will be wound are integrally formed on the stator portion 66. A connector 68 is also integrally formed on the stator portion 66.

Figure 4:
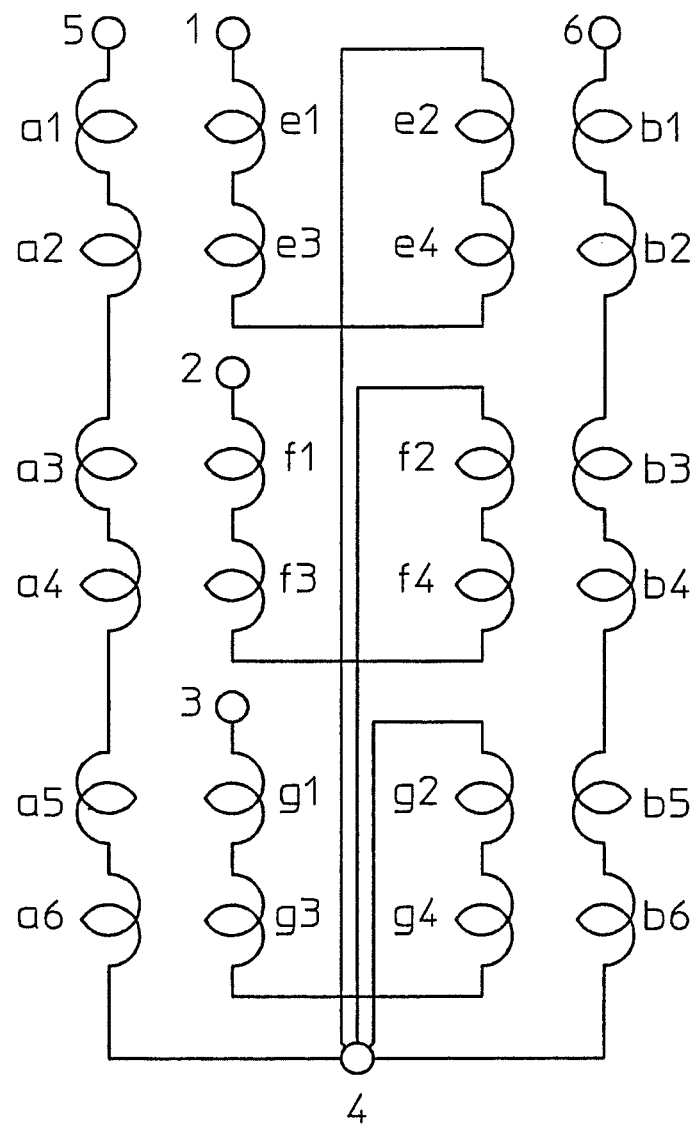
FIG. 4 shows a winding layout of FIG. 1.
Figure 7:
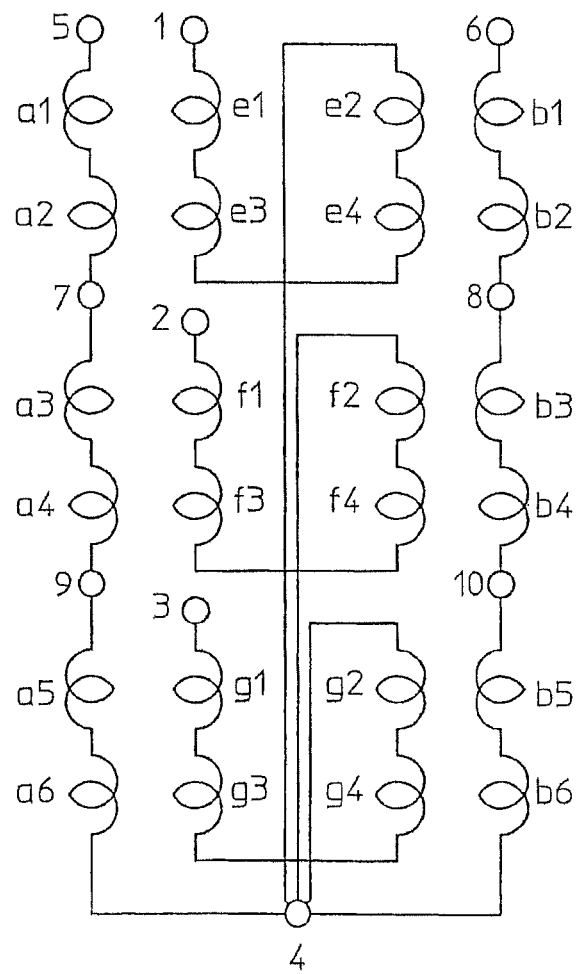
FIG. 7 is a winding layout of FIG. 6.

FIG. 4 shows a winding layout of a resolver in accordance with the embodiment of the present invention shown in FIG. 1. In comparing the winding layout of the embodiment of the present invention shown in FIG. 4 with that of the conventional art shown in FIG. 7, it can be seen that, of the ten pins 1 to 10 of the connector between resolvers arranged in the axial direction shown in FIG. 7, four of the pin, pins 7 to 10 are not shown in FIG. 4.

FIG. 9 is a table showing relationships among the windings in FIG. 1, and the excitation and sensing wirings in FIG. 4. The integrally-formed stator portion 66 can be mounted on a winding machine. After connecting one end of magnet wire to a connecting portion 120 of the connector 68 in accordance with the wiring layout shown in FIG. 4, the magnet wire can be wound around each of the bobbins integrally formed on each pole tooth 101 to 104. Each pole tooth 101 to 104 of the three resolvers 600, 620, 640 can be wound by a single electrical wire with no splice. Then, the other end of the magnet wire is connected to the connecting portion 120 of the connector 68. By soldering or arc welding the connecting portion 120, the magnet wire is electrically connected to the connector 68. By repeating these operations several times, the stator portion 66 common to the three reluctance-type resolvers 600, 620, 640 is assembled.

Because the rotor 60 is fixed to the input shaft 19, when the input shaft 19 is rotated one turn, the rotor 60 is also rotated one turn. Further, the gear 25 which is fixed to the input shaft 19 engages with the gear 26 with which a shaft 20 is fitted, thereby driving the shaft 20 and a gear 27 coupled thereto. The gear 27 engages with gears 28, 30 to drive the rotors 62, 64. By configuring a speed reducer mechanism 35 by combining gears 25 to 30 in such a manner, the rotor 62 is rotated once for every 24 revolutions of the input shaft 19, while the rotor 64 is rotated once for every 25 revolutions of the input shaft 19.

The rotors 60, 62, 64 are arranged so as to be surrounded by the pole teeth 101 to 104 of the three sets included in the stator portion 66 with casings 81, 84, spacer 67, and bearings 90, 95, 91, 92. Further, the connector 68 is connected to a connector of a signal processing circuit (not shown).

In the above embodiment, a configuration in which the three resolvers 600, 620, 640 are arranged in a single plane is described. However, the present invention is not limited to such an embodiment. The present invention does not require that all of the resolvers should be placed in a single plane, but is also applicable to other multi-turn angle sensors including a plurality of resolvers as long as at least two of the resolvers are arranged in the same plane.

What is claimed is:

1. A multi-turn angle sensor comprising a plurality of resolvers, further comprising:
   a plurality of rotors, each rotating in a different manner with respect to an input shaft by use of a speed reduction mechanism; and
   a common stator portion including a plurality of sets of pole teeth, each set provided around each of the plurality of rotors,
   wherein each of the rotors and each of the sets of pole teeth disposed around each of the rotors form each of the resolvers;
   at least two of the plurality of resolvers are arranged in a single plane vertical to a rotation central axis of each rotor; and
   the common stator portion including the plurality of sets of pole teeth, each set disposed around each of the rotors, is formed by laminating electromagnetic steel sheets, each having an identical shape including, in a single plane, the plurality of sets of pole teeth corresponding to each of the rotors,
   wherein sensing wirings wound around respective pole teeth of the plurality of resolvers are configured by winding a single length of electrical wire with no joint for a plurality of pole teeth of the plurality of resolvers, and
   wherein excitation wirings wound around respective pole teeth of the plurality of resolvers and the sensing wirings wound around the respective pole teeth of the plurality of resolvers are connected to a common connecting portion.

2. The multi-turn angle sensor according to claim 1, wherein each of the pole teeth of the stator portion of the plurality of resolvers has a resin bobbin which is integrally formed therewith and around which is wound a winding.

* * * * *